United States Patent [19]
Kehl

[11] 4,105,357
[45] Aug. 8, 1978

[54] CARBIDE INSERT CUTTING TOOL

[76] Inventor: John Kehl, 2714 Westminster Blvd., Windsor, Ontario, Canada

[21] Appl. No.: 681,179

[22] Filed: Apr. 28, 1976

[51] Int. Cl.² .................................................. B26D 1/12
[52] U.S. Cl. ...................................... 407/41; 408/188
[58] Field of Search ............ 29/103 A, 105 R, 105 A; 408/188

[56] References Cited

U.S. PATENT DOCUMENTS

| | | | |
|---|---|---|---|
| 2,805,467 | 9/1957 | Greenleaf | 29/105 A |
| 3,158,922 | 12/1964 | Reese | 29/105 R |
| 3,273,223 | 9/1966 | Wright | 29/105 R |
| 3,785,746 | 1/1974 | Wolf et al. | 408/188 |

FOREIGN PATENT DOCUMENTS 933,613   8/1963   United Kingdom .................. 29/105 A

*Primary Examiner*—Leonidas Vlachos
*Attorney, Agent, or Firm*—Charles Krassov

[57] ABSTRACT

This invention is a tool for light machining or finishing of metals in profile machining operations. It consists of a cylindrical shank which terminates at its top in a narrow flared out head which is provided with one or more equally spaced open top and open front cavities which extend partly into the shank. Each cavity has two downwardly converging side walls and one rear wall which extends to form the floor of the cavity. A flat, usually triangular carbide cutter is inserted into each cavity and is held in position between one of the side walls and a wedge which slides within and is tightened against the carbide cutter by means of a setscrew which screws into the floor of the cavity. The invention is shown in two forms, in one of which the release of the wedge releases the pressure on the carbide cutter for replacement purposes, while in the other form the release of the wedge releases the pressure on the carbide cutter and also provides additional clearance space for the cutter to be easily replaced.

2 Claims, 8 Drawing Figures

CARBIDE INSERT CUTTING TOOL

This invention consists generally of a milling machine tool, and particularly of a carbide insert cutting tool used mainly in profile tracing milling machines for light machining or finishing.

There are many types of milling machines used at the present time for machining metals into various machine parts, dies, tools, etc. Generally the operation consists of feeding the metal against a rotating cutter. One form of milling machine is called a profiler, because it is used for producing shapes in metals and other materials by having a tracer follow the contour or profile of a master form, so that this motion is translated into a cutting operation. The final result is a complete duplicate of the master form made of the material which was being cut.

In most cases, the cutting operation may take place in several stages, depending upon the quantity of metal which is to be cut away. The final stage of the operation is the final cut which is done lightly to provide a finished and precise surface to the completed product.

Figure 3:
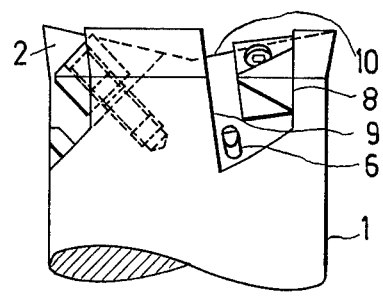
Figure 4:
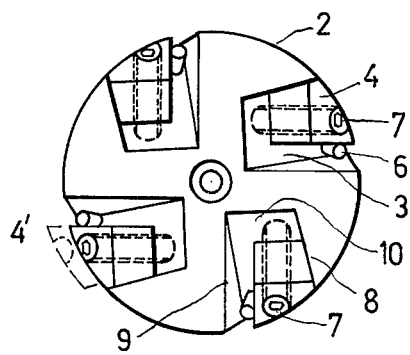
Figure 7:
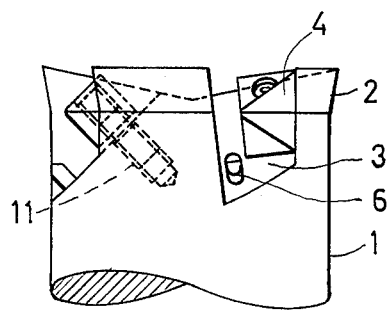
Figure 5:
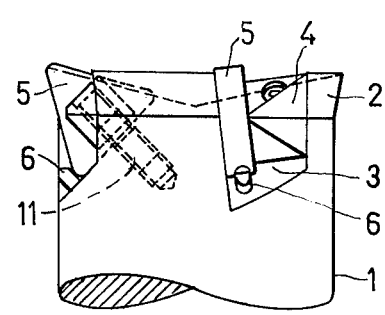
Figure 8:
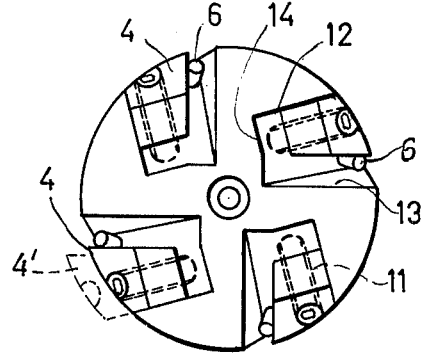
Figure 6:
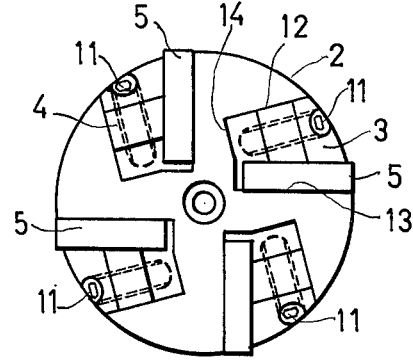

This invention, which is a tool designed to perform this final stage in a very proficient manner, also embodies a number of valuable advantages over tools for similar purposes which were being used prior to this invention. These advantages will become obvious from the following description and attached drawings, in which, FIG. 1 is an elevation of the cutting tool head, with the shank of the tool shown in part, and the carbide cutters in position, FIG. 2 shows a plan of FIG. 1, FIG. 3 shows an elevation of the tool head shown in FIG. 1, with the carbide cutters removed, FIG. 4 shows a plan view of FIG. 3, FIG. 5 shows an elevation of the head of a variation in the construction of the cutting tool, with the carbide cutters therein, FIG. 6 shows a plan view of FIG. 5, FIG. 7 shows a view similar to that of FIG. 5, with the carbide cutters removed, and FIG. 8 shows a plan view of FIG. 7.

Figure 1:
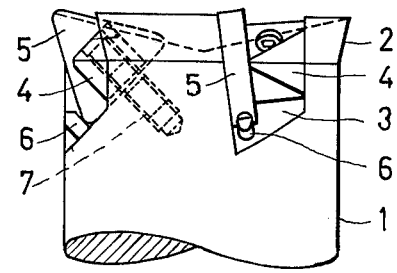
Figure 2:
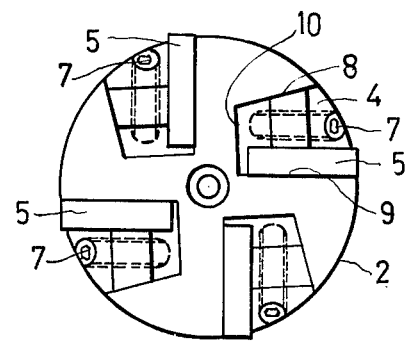

In FIG. 1 of the drawings, the tool is shown consisting of a solid cylindrical shank 1, the upper part of which only is shown since the bottom of the shank is machined the same as other similar tools for standard installation into the profiler.

The head of the tool ends in a narrow flared out section 2 which spreads away from the wall of the shank 1. The head 2 is also provided with a plurality of equally and radially spaced identical cavities 3. A flat triangular carbide cutter 5 is inserted into each of the cavities 3, so that its cutting edge extends slightly beyond the flared part 2, and thereby clears the cylindrical wall of the shank during the cutting operation. The cutter 5 is rigidly held in the cavity 3 by means of a wedge 4 which is in turn held tightly by a setscrew 7.

The cavity 3 is open at the top of the head 2, and and has an open front which extends a short distance down the shank 1, so that the said cavity actually has two side walls 8 and 9, and a rear wall 10 which slopes downward towards the wall of the shank 1. The carbide cutter 5 is inserted into the cavity 3 and is held in the required cutting position, against the side wall 9 by the front of the wedge 4, while the rear wall of said wedge rests against the other side wall 8. The side walls 8 and 9 converge slightly towards the bottom of said cavity so that the further the wedge 4 is pushed down into the cavity the tighter the cutter 5 is held. The pushing down of the wedge 4 is accomplished by means of the setscrew 7 which passes through a hole in said wedge and screws into a tapped hole in the bottom of the rear wall of the cavity and into the shank 1. The wedge 4 is held by the head of the setscrew 7 which is located in a counter-bored part of the wedge hole. Near its bottom, the rear wall of the cavity is also provided with a short pin 6 which serves to locate the bottom of the cutter 5 when it is being inserted.

In FIGS. 5, 6, 7, and 8 is shown a slight variation in the construction of the invention. In this case, all components are identical with the components shown and described in connection with the FIGS. 1, 2, 3, and 4, except for the wall structure of the cavity 3. Although the wall 13, which abuts the carbide cutter 5 is identical with the wall 9 of FIG. 2, the rear wall 14 differs from the corresponding wall 10 in that it starts off a short distance from the wall 13 at rightangles to it, the same as the wall 10 does in relation to the wall 9, but the wall 14 is bent slightly away from the cavity 3.

The purpose of this bend in the rear wall 14 can be explained by the fact in each of the tool heads shown in FIGS. 1 and 5, the tapped hole in the rear wall is at right-angles to it, so that in each case when the setscrew is partly unscrewed, the wedge 4 is loosened so that the cutting tool 5 can be replaced or rotated to provide a new cutting edge. However, in this case, when the wedge is loosened the space between the wall 9 and the wedge has changed verly little, so that at times it can be difficult to insert the replacement carbide cutter. When the setscrew 11 is partly unscrewed, the bend in the wall 14 tends to move the wedge 4 away from the cutter, thus increasing the space between the wall 13 and the wedge 4, thereby making it easy to replace the cutter 5. This difference is shown by 4', 4' in the FIGS. 4 and 8.

From the above description it can be seen that the invention has the following advantages over the types of profiler cutting tools used prior to this invention:

(a) The flare of the head makes the invention self clearing, so that cutting edges are not damaged during the up and down duplicate milling of vertical walls.

(b) The invention provides greater economy because of the double-negative rake. Inserts provide four times improved cutting time per edge, over positive rake.

(c) The invention can run at a higher RPM thus permitting a higher feed rate. In actual practice, a feed rate of 22 inches per minute has produced excellent finishes, (d) Inserts of the carbide cutters can be done easily, rapidly, and accurately.

(e) The solid, sturdy construction of the tool eliminates vibration and provides true running.

(f) The cutting tool is not affected by accidental running into a wall of the item which is being cut.

In describing the invention a cutting tool having four cavities and consequently four carbide cutters, has been used to illustrate the invention. This was done purely by way of example, and it is not thereby intended to limit the scope of this invention to this particular number of cavities, since one cavity or any other number of cavities can be used dependent upon the diameter of the shank 1, and the speed required to do the cutting.

Having described the invention, what I claim is:

1. A cutting tool for light final stage cutting and precision finishing only of metals and other materials in profiling machine operations, capable of continuous uninterrupted cutting in all directions and planes, because it is capable of cutting in an upward or downward direction without requiring the removal of the cutter from the work to change the direction of the cutting; comprising a solid metalic cylindrical shank which terminates at its top with a narrow flared head; a plurality of open top, open front, and equally spaced cavities located at the periphery of said head and extending into the shank, for inserting therein carbide cutters, each of said cavities having two side walls and a rear wall which extends at a downward angle to the wall of said shank to form the floor of said cavity, and a tapped hole in said rear wall extending at a right angle thereto, said side walls diverging in a plane perpendicular to the axis of said cylindrical shank toward the outer surface of said shank, said side walls also diverging in a plane parallel to the axis of said cylindrical shank toward the head end of said tool; a carbide cutter of generally triangular shape with spaced, parallel side walls in each of said cavities; a wedge located within each cavity for holding and locking said carbide cutter within said cavity; a setscrew for fastening said wedge to the cavity, while at the same time wedging the said carbide cutter against one wall of said cavity; and a short pin located in said cavity to aid in locating the said carbide cutter within the cavity, in the proper position for cutting.

2. A cutting tool according to claim 1 characterized by said rear wall having two planar portions, one being substantially perpendicular to one of said side walls and the other being substantially perpendicular to the other of said side walls, said planar portions meeting along a central line to form a shallow V-shaped contour for said rear wall in transverse cross section.

* * * * *